(12) United States Patent
White

(10) Patent No.: US 11,193,806 B2
(45) Date of Patent: Dec. 7, 2021

(54) METER WITH A BUNG FOR MOUNTING ACCESSORIES

(71) Applicant: Meter Technology Werks, LLC, Tampa, FL (US)

(72) Inventor: Matthew White, Tampa, FL (US)

(73) Assignee: Meter Technology Werks, LLC, Tampa, FL (US)

( * ) Notice: Subject to any disclaimer, the term of this patent is extended or adjusted under 35 U.S.C. 154(b) by 95 days.

(21) Appl. No.: 16/738,642

(22) Filed: Jan. 9, 2020

(65) Prior Publication Data

US 2021/0215524 A1 Jul. 15, 2021

(51) Int. Cl.
*G01F 15/14* (2006.01)
*G01F 15/18* (2006.01)

(52) U.S. Cl.
CPC .............. *G01F 15/14* (2013.01); *G01F 15/18* (2013.01)

(58) Field of Classification Search
CPC ................................. G01F 15/14; G01F 15/18
USPC ........................................................... 73/273
See application file for complete search history.

(56) References Cited

U.S. PATENT DOCUMENTS

| | | | | |
|---|---|---|---|---|
| 3,590,473 A | * | 7/1971 | Carlson | F16K 5/10 29/890.127 |
| 3,695,106 A | * | 10/1972 | Geisow | G01F 1/115 73/861.91 |
| 4,269,353 A | * | 5/1981 | Ivandick | A01M 13/00 239/77 |
| 4,559,834 A | * | 12/1985 | Phillips | F16K 1/04 73/861.55 |
| 4,887,469 A | * | 12/1989 | Shoptaw | G01F 1/065 73/861.77 |
| 5,381,826 A | * | 1/1995 | Franz | G01F 1/22 137/360 |
| 6,212,957 B1 | * | 4/2001 | McCombs | G01F 1/22 73/1.33 |
| 6,581,458 B1 | * | 6/2003 | Hathaway | G01F 1/08 73/238 |
| 6,615,673 B1 | * | 9/2003 | Cullie | G01F 1/3218 73/861.21 |

* cited by examiner

*Primary Examiner* — Nathaniel T Woodward

(57) ABSTRACT

Embodiments of the present invention provide an apparatus for a meter with a bung. In an embodiment of the invention, a meter includes a main case, an inlet at a distal end of the main case, an outlet at an opposite distal end of the main case, and a bung positioned on the meter.

19 Claims, 2 Drawing Sheets

METER WITH A BUNG FOR MOUNTING ACCESSORIES

BACKGROUND OF THE INVENTION

Field of the Invention

The present invention relates to the field of meters and more particularly to water meters and gas meters.

Description of the Related Art

Meters for fluids, such as water meters and gas meters, are utilized to determine the volume of fluid being supplied to a residential or commercial structure. The meter is assembled between the water lines or gas lines of the structure and the utility lines of the utility company supplying the water or gas. The meter then measures and records the volume of fluid flowing through the meter. The volume of the fluid is then read off of the meter or transmitted to the utility system for processing. Meters may also include automated meter reading (AMR) technology for collecting and reporting usage information relating to the meter. Given that meters are typically installed in pits in the ground, it can be difficult for the AMR to report information based on interference and other obstructions deep in the pit.

Due to the need for accurate readings from the meters, water meters and gas meters constantly need to be checked for accuracy and eventually need to be replaced. However, the current design of water meters and gas meters do not provide any space for a plumber to easily mount accessories and tools that the plumber utilizes. Similarly, the current design for meters does not provide a mechanism for installing and associating AMR equipment with a meter such that the AMR equipment is closer to the surface while the meter is installed deeper in the ground.

BRIEF SUMMARY OF THE INVENTION

Embodiments of the present invention address deficiencies of the art in respect to meters and provide a novel and non-obvious apparatus for a meter with a bung for mounting accessories. In an embodiment of the invention, a meter for fluid measurement includes a main case, an inlet at a distal end of the main case, an outlet at an opposite distal end of the main case, and a bung positioned on the meter.

In one aspect of the embodiment, the bung is configured to receive a rod. In another aspect of the embodiment, an interior surface defining a hole of the bung is threaded. In yet another aspect of the embodiment, an exterior surface of the rod is threaded to match the threading of the bung.

In another aspect of the embodiment, the rod is configured to receive equipment associated with the meter. In one aspect of the embodiment, the equipment is AMR equipment. In yet another embodiment, the rod is sufficiently long enough that AMR equipment connected to the rod is close to the ground surface improving the signal capabilities of the AMR equipment.

In yet another aspect of the embodiment, the bung is cast in place. In even yet another aspect of the embodiment, the inlet and the outlet each comprise a flat exterior portion. In another aspect of the embodiment, the bung is positioned on a one of the flat exterior portions. In yet another aspect of the embodiment, the flat exterior portions are cast in place. In even yet another aspect of the embodiment, the flat exterior portions of the inlet and outlets are configured to hold a wrench in place.

In another embodiment of the invention, a meter for fluid measurement includes a main case, an inlet at a distal end of the main case and an outlet at an opposite distal end of the main case. The inlet and the outlet each include a flat exterior portion where the flat exterior portions are cast in place configured to hold a wrench in place. The meter further includes a bung positioned and cast in place on at least one of the flat exterior portions where the bung is threaded and configured to receive a rod.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for an apparatus for a meter with a bung for mounting accessories. In an embodiment of the invention, the meter includes a main case that includes components for measuring the volume of fluid flowing through the meter. The meter includes an inlet at a distal end of the main case that attaches to the supply of fluid and an outlet at an opposite distal end of the main case that attaches to the fluid lines of the residential or commercial structure. The fluid, such as gas or water, then flows from the inlet through the measuring components of the main case and exits through the outlet. The meter includes a bung that is threaded in order to receive a correspondingly threaded rod to easily attach or hang electrical accessories or meter AMR accessories to the meter for use by the plumber or any end user. The exterior of the inlet and outlet portions of the meter include flats portions so that a wrench can easily be mounted on the flats portion to hold the wrench in place while a plumber or any end user work on the water meter.

Figure 1:
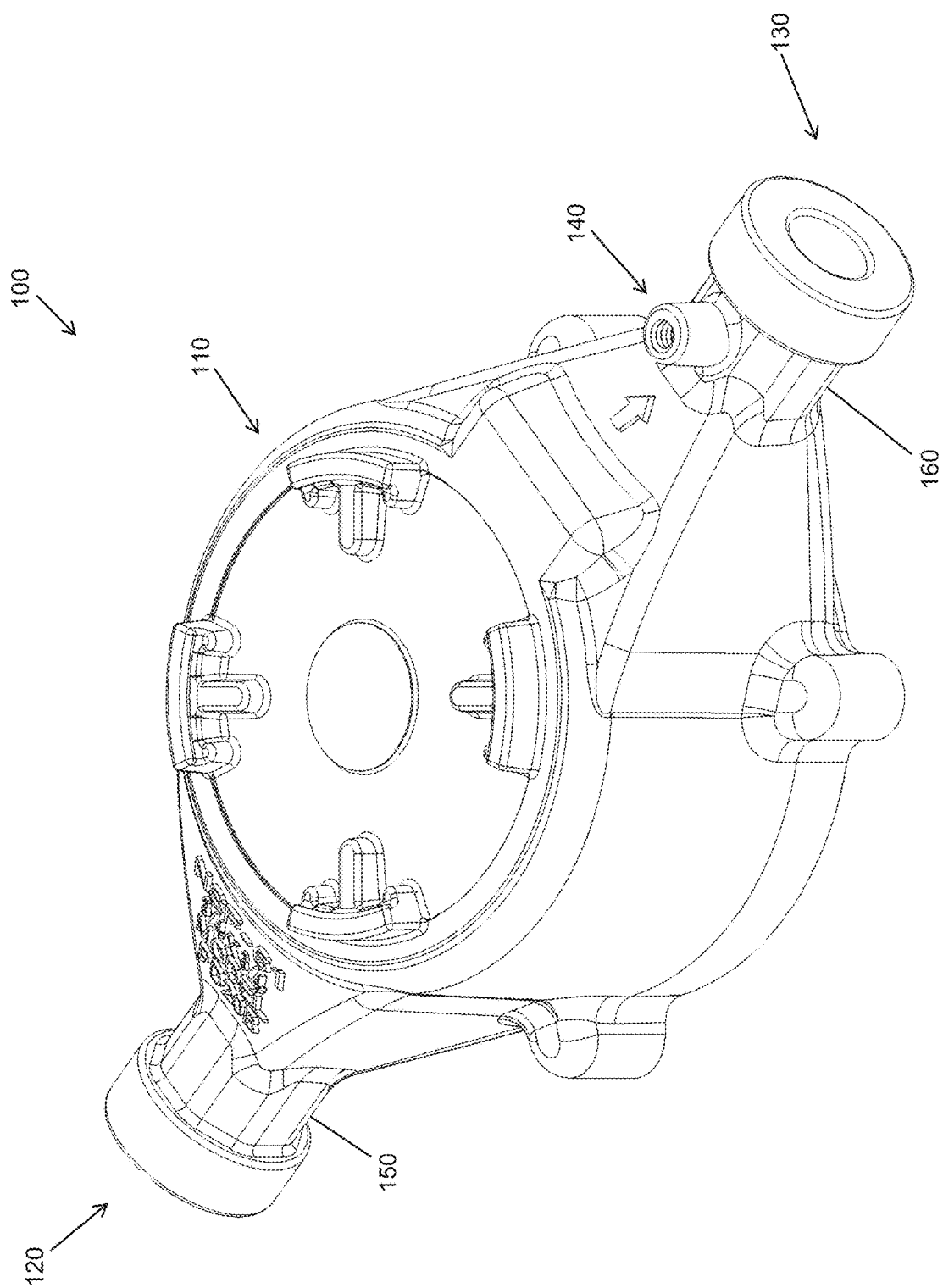
FIG. 1 is a front, right isometric view of a pictorial illustration of a meter with a bung in accordance with an embodiment of this invention; and, FIG. 2 is a front, left isometric view of a pictorial illustration of a meter with a rod inserted into a bung in accordance with an embodiment of this invention.
Figure 2:
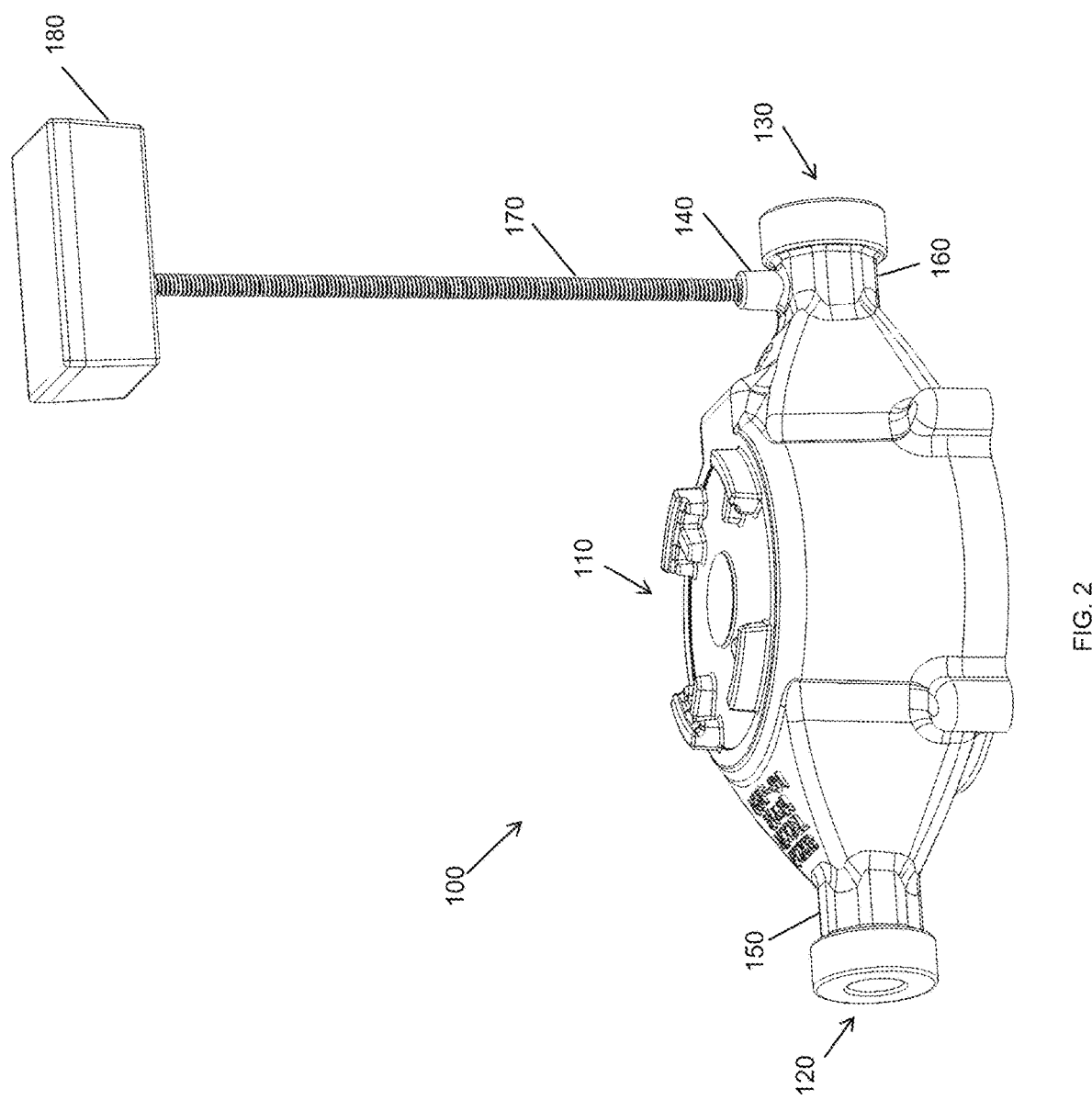

In further illustration, FIG. 1 pictorially shows a meter with a bung in accordance with an embodiment of this invention and FIG. 2 pictorially shows a meter with a rod inserted into a bung in accordance with an embodiment of this invention. As shown in FIGS. 1 and 2, a meter 100 includes a main case 110, an inlet 120 at a distal end of the main case, an outlet 130 at an opposite distal end of the main case, and a bung 140 positioned on the meter. Fluid, such as gas or water, flows from the inlet through the main case for measurement and exits through the outlet.

The main case 110 of the meter 100 is a housing for the internal meter components, such as mechanical or electrical components for measuring the amount of fluid entering and exiting the meter, recording and displaying the amount of fluid usage and/or sending the information regarding the fluid system to relevant parties.

The meter 100 includes an inlet 120 and an outlet 130 on opposite ends of the main case 110. The inlet and outlet are for connecting the meter to piping for the fluid, such as water or gas lines. As shown in FIGS. 1 and 2, the inlet and the outlet each include flat exterior portions 150 and 160, respectively. Alternatively, the flat portion may be only located on one of the inlet or outlet. As can be seen, the flat portions are generally n-gon polygons in cross-section, such as the octagonal cross-section depicted in FIGS. 1 and 2. The flats portion provides a space for a plumber or end user to mount a wrench to hold the wrench in place while working on the meter. Therefore, the flat portions 150 and 160 may be any n-gon polygon that allows the plumber or end user to mount the wrench. Alternatively, the flat portions 150 and 160 may include two flat portions opposite one another and any shape in between the two flat portions.

As further shown in the embodiment of the invention depicted in FIGS. 1 and 2, a bung 140 is located on the meter to allow a plumber or end user to mount electrical or meter AMR accessories. As shown in FIGS. 1 and 2, the bung 140 may be located on the flat portion 160 of the outlet 130 of the meter 100. However, the bung 140 may be located on the flat portion 150 of the inlet 120 of the meter 100. Furthermore, the bung 140 being located anywhere on the meter 100 is with the scope of this invention.

As shown in FIGS. 1 and 2, the interior surface of the bung 140 that defines the hole of the bung 140 may be threaded. A rod 170 with block 180 may include corresponding threading to be screwed into the threading of the bung 140. In this way, electrical accessories or meter accessories can be mounted or hung in this location of the meter 100.

The meter 100, including the main case 110, bung 140, inlet 120 and outlet 130, may be manufactured from materials including, but not limited to, bronze, cast iron, stainless steel, plastics or other non-corrosive materials, or any combination of the materials. The main case 110, bung 140, the inlet 120 and outlet 130, include the flats portions 150 and 160, may all be cast into place or assembled separately. The rod 170 may be manufactured from any material or any of the materials of the meter 100.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A meter for fluid measurement comprising:
a main case;
an inlet at a distal end of the main case;
an outlet at an opposite distal end of the main case; and,
a bung positioned on the meter, wherein the bung has no connection to fluid passage within the meter.

2. The meter of claim 1, wherein the bung is configured to receive a rod.

3. The meter of claim 2, wherein an interior surface defining a hole of the bung is threaded.

4. The meter of claim 3, wherein an exterior surface of the rod is threaded to match the threading of the bung.

5. The meter of claim 1, wherein the bung is cast in place.

6. The meter of claim 1, wherein the inlet and the outlet each comprise a flat exterior portion.

7. The meter of claim 6, wherein the bung is positioned on a one of the flat exterior portions.

8. The meter of claim 6, wherein the flat exterior portions are cast in place.

9. The meter of claim 8, wherein the flat exterior portions of the inlet and outlets are configured to hold a wrench in place.

10. The meter of claim 1 further comprising a rod connected to the bung.

11. The meter of claim 10 further comprising an automated meter reading device, wherein the automated meter reading device is installed on the rod.

12. The meter of claim 10, wherein the rod has a first end and a second end, wherein the rod is connected to the bung at the first end.

13. The meter of claim 12, wherein the second end of the rod is configured to hold an automatic meter reader.

14. The meter of claim 12, wherein the second end of the rod is configured to hold an accessory.

15. The meter of claim 1 wherein the inlet is configured to hold a wrench in-place.

16. The meter of claim 1 wherein the outlet is configured to hold a wrench in-place.

17. The meter of claim 1 wherein the inlet comprises a flat exterior surface.

18. The meter of claim 1 wherein the outlet comprises a flat exterior surface.

19. A meter for fluid measurement comprising:
a main case;
an inlet at a distal end of the main case;
an outlet at an opposite distal end of the main case;
the inlet and the outlet each comprising a flat exterior portion, wherein the flat exterior portions are cast in place and configured to hold a wrench in place; and,
a bung positioned and cast in place on at least one of the flat exterior portions, wherein the bung is threaded and configured to receive a rod wherein the bung has no connection to fluid passage within the meter.

* * * * *